United States Patent
Goodwin et al.

(10) Patent No.: US 7,742,698 B2
(45) Date of Patent: Jun. 22, 2010

(54) METHOD AND SYSTEM FOR MONITORING AN OPTICAL NETWORK

(75) Inventors: Jim O. Goodwin, Lucas, TX (US);
Larry H. Steinhorst, Plano, TX (US);
Wilson K. Chan, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 1446 days.

(21) Appl. No.: 10/941,679

(22) Filed: Sep. 15, 2004

(65) Prior Publication Data

US 2006/0056844 A1    Mar. 16, 2006

(51) Int. Cl.
H04B 10/20    (2006.01)
H04B 10/08    (2006.01)

(52) U.S. Cl. .............................. 398/33; 398/17; 398/31; 398/59

(58) Field of Classification Search .................. 398/18, 398/19, 216, 217, 221–224, 1–6, 17, 25, 398/30–33, 37, 38, 59; 370/116, 117, 221–224
See application file for complete search history.

(56) References Cited

U.S. PATENT DOCUMENTS

| | | | | |
|---|---|---|---|---|
| 5,757,768 A | * | 5/1998 | Goto et al. | 370/222 |
| 5,978,113 A | * | 11/1999 | Kight | 398/1 |
| 6,130,876 A | * | 10/2000 | Chaudhuri | 370/228 |
| 2005/0058064 A1 | * | 3/2005 | Phelps et al. | 370/225 |

OTHER PUBLICATIONS

"SONET Bidirectional Line-Switched Ring Equipment Generic Criteria", A Module of TSGR, FR-440, Bellcore, Generic Requirements GR-1230-CORE, Issue 4, 276 pages, Dec. 1998.

* cited by examiner

*Primary Examiner*—Dalzid Singh
(74) *Attorney, Agent, or Firm*—Baker Botts L.L.P.

(57) ABSTRACT

A method for monitoring an optical network includes communicating optical traffic along a working path of an optical network. The optical network comprises a protection path for the optical traffic to communicate the optical traffic upon a failure in the working path. The protection path comprises two or more network elements coupled together by optical lines. The method also includes monitoring an idle signal of the protection path to detect an error in the protection path comprising an error in a component of one or more of the network elements.

29 Claims, 2 Drawing Sheets

METHOD AND SYSTEM FOR MONITORING AN OPTICAL NETWORK

TECHNICAL FIELD OF THE INVENTION

The present invention relates generally to optical communication systems and, more particularly, to a method and system for monitoring an optical network.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks often employ wavelength division multiplexing (WDM) or dense wavelength division multiplexing (DWDM) to increase transmission capacity. In WDM and DWDM networks, a number of optical channels are carried in each fiber at different wavelengths or frequencies. Network capacity can be defined based on the number of wavelengths, or channels, in each fiber, and the bandwidth, or size, of the channels.

Particular optical networks may include Bi-Directional Line Switched Ring (BLSR) capability enabling the switching of optical traffic to a protection path if a failure or error occurs in a working path carrying the optical traffic. Thus, the working path is monitored for errors. Some networks monitor the optical fibers between network elements of the protection path for line cuts or errors in the optical components.

SUMMARY OF THE INVENTION

The present invention provides a method and system for monitoring an optical network that substantially eliminates or reduces at least some of the disadvantages and problems associated with previous methods and systems.

In accordance with a particular embodiment of the present invention, a method for monitoring an optical network includes communicating optical traffic along a working path of an optical network. The optical network comprises a protection path for the optical traffic to communicate the optical traffic upon a failure in the working path. The protection path comprises two or more network elements coupled together by optical lines. The method also includes monitoring an idle signal of the protection path to detect an error in the protection path comprising an error in a component of one or more of the network elements.

The method may include generating an alarm upon detection of an error in the protection path. Each of one or more of the network elements may comprise a switch fabric unit along the protection path. The protection path may comprise one or more spans interconnecting switch fabric units of adjacent network elements of one or more of the network elements. The one or more spans may comprise an optical line between the adjacent network elements, interface units between the interconnected switch fabric units, backplanes coupling together components between the interconnected switch fabric units within the adjacent network elements and the switch fabric units of the adjacent network elements. Monitoring an idle signal of the protection path to detect an error in the protection path may comprise monitoring each of the one or more spans of the protection path. Monitoring an idle signal of the protection path to detect an error in the protection path comprising an error in a component of one or more of the network elements may comprise monitoring an idle signal of the protection path to detect an error in the protection path comprising an error in a backplane, an interface unit or a switch fabric unit of one or more of the network elements.

In accordance with another embodiment, a system for monitoring an optical network includes an optical network comprising a plurality of network elements coupled together by optical lines. The optical network is operable to communicate optical traffic along a working path of the optical network. The optical network includes a protection path for the optical traffic to communicate the optical traffic upon a failure in the working path. The protection path includes two or more of the plurality of network elements and the optical lines coupling together the two or more of the plurality of the network elements. The system includes an error detection unit associated with the optical network. The error detection unit is operable to monitor an idle signal of the protection path to detect an error in the protection path comprising an error in a component of the two or more of the plurality of network elements.

Technical advantages of particular embodiments of the present invention include a method and system for monitoring an optical network that implements protection path performance monitoring in the network. This protection path monitoring detects errors in protection paths for optical traffic communicated through working channels. Since this performance monitoring is at a path level, error detection is extended beyond the optical lines connecting network elements, or nodes, of the network and into the actual network element components. This results in more extensive monitoring than mere line performance monitoring for the protection path or bandwidth. Thus, it leads to a higher level of assurance that the protection bandwidth is available and able to carry traffic in an error-free manner when necessary. Moreover, protection path errors can be determined prior to a failure in the working path.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
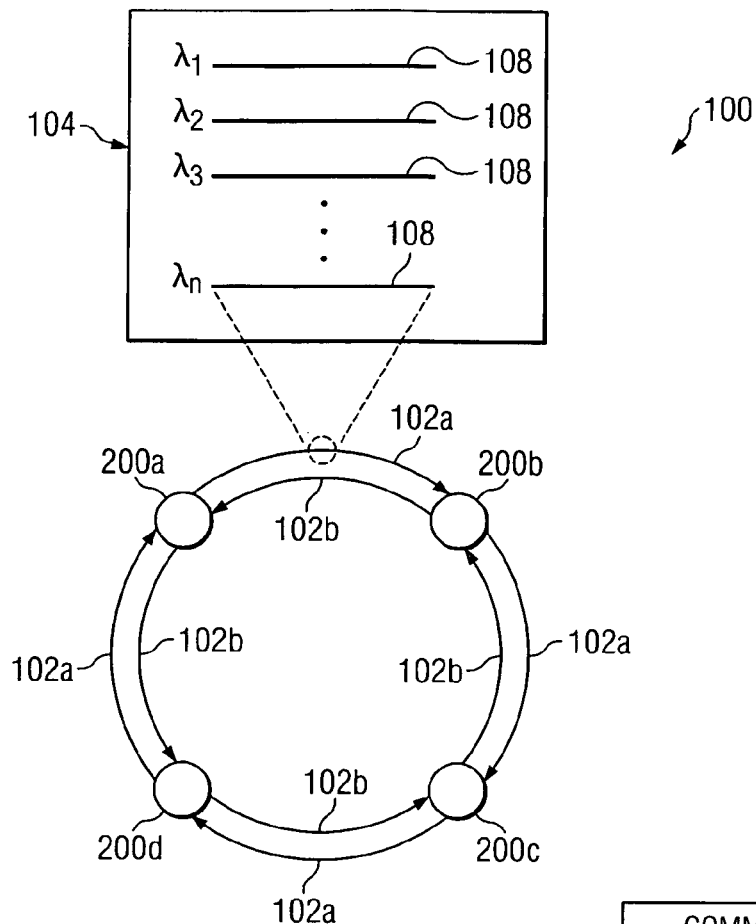
FIG. 1 illustrates an optical network, in accordance with one embodiment.

FIG. 1 illustrates an optical network 100 that communicates information between network nodes 200 using optical links 102, in accordance with a particular embodiment. Optical network 100 generally represents any collection of hardware and/or software that communicates information between network nodes 200 in the form of optical signals. In a particular embodiment, optical network 100 uses wavelength division multiplexing (WDM) or dense wavelength division multiplexing (DWDM) to communicate information on multiple channels, each channel using a different wavelength. Network nodes 200, referring generally to nodes 200a, 200b, 200c and 200d, represent any hardware and/or software that receives information carried in optical network 100 in the form of optical signals, processes that information in any suitable fashion, and/or communicates information to optical network 100.

Nodes 200 are each operable to add and drop traffic to and from links 102. In particular, each node 200 receives traffic from local clients and adds that traffic to links 102. At the same time, each node 200 receives traffic from links 102 and drops traffic destined for the local clients. As used throughout this description and the following claims, the term "each" means every one of at least a subset of the identified items. In adding and dropping traffic, nodes 200 may combine data from clients for transmittal in links 102 and may drop channels of data from links 102 for clients. Traffic may be dropped by making the traffic available for transmission to the local clients. Thus, traffic may be dropped and yet continue to circulate on a link. Nodes 200 communicate the traffic on links 102 regardless of the channel spacing of the traffic. Nodes 200 may include multiplexers, demultiplexers, optical switches, amplifiers such as erbium doped fiber amplifiers (EDFAs), optical-electronic converters or any other suitable hardware and/or software for processing optical signals.

Links 102 represent any suitable links for communicating optical signals 104 between network nodes 200. As such, links 102 may include any manner of optical communication medium, including optical fibers such as single-mode fiber, dispersion compensation fiber, dispersion-shifted fiber, non-zero dispersion shifted fiber. Links 102 may also include any other suitable optical components, such as EDFAs, repeaters, or optical-electronic-optical (OEO) converters. Links 102 may carry information using any suitable format or protocol, including frame relay, asynchronous transfer mode (ATM), synchronous optical network (SONET), or any other suitable method of communication. Links 102 may also perform any necessary signal and/or protocol conversion necessary to communicate information between nodes 200.

Links 102 may be bidirectional, thus carrying optical traffic in both an "eastbound" (e.g., clockwise around optical network 100) path and a "westbound" (e.g., counterclockwise around optical network 100) path. Each link 102 may include one or multiple optical fibers or other media for communicating optical signals 104, and nodes 200 of optical network 100 may be arranged in any suitable configuration, including ring, star, linear or other suitable network configuration. In the illustrated embodiment, links 102a comprise one optical ring, and links 102b comprise another optical ring. In a particular embodiment, network 100 may be a Bi-directional Line Switched Ring (BLSR) network. A BLSR network includes protection channels comprising redundant bandwidth allocated to transport working traffic subsequent to an error affecting the working channels. In one implementation, traffic sent from a first node 200 to a second node 200 is communicated over a "working" path over one ring (e.g., over one or more of links 102a), and the other ring (e.g., comprising links 102b) is used for protection. Upon a line cut or other failure of the working ring, the links of the protection ring may be used to communicate traffic from one node to another.

In a particular embodiment, links 102 carry optical signals 104 that have a wavelength spectrum of the form shown in FIG. 1. Digital as well as analog signals may be communicated on optical links 102. In signal 104, the optical information is apportioned in several different wavelengths 108. Each wavelength 108 represents a particular channel. Information carried on links 102 may be assigned to any particular wavelength 108 and optical signal 104. Using appropriate equipment, wavelengths 108 may be added, dropped, switched, or otherwise processed separately. Signal 104 may also include an optical supervisory channel (OSC) that represents one or more wavelengths assigned to carry information used for management of network 100. For example, the OSC may communicate status information for the channels 108 indicating whether each channel 108 is provisioned and whether there has been an error detected in communication of channel 108. Any number of wavelengths may be assigned to the OSC for carrying network management information.

Particular embodiments implement protection path performance monitoring to detect errors in protection paths for optical traffic communicated through working channels. Since this performance monitoring is at a path level, error detection is extended beyond the optical lines connecting network elements, or nodes, of the network and into the actual network element components. This results in more extensive monitoring than mere line performance monitoring for the protection path or bandwidth. Thus, it leads to a higher level of assurance that the protection bandwidth is available and able to carry traffic in an error-free manner when necessary. Moreover, protection path errors can be determined prior to a failure in the working path. It should be understood that this protection path performance monitoring functionality may be implemented in either two fiber or four fiber BLSR optical networks or any other suitable types of networks.

Figure 2:
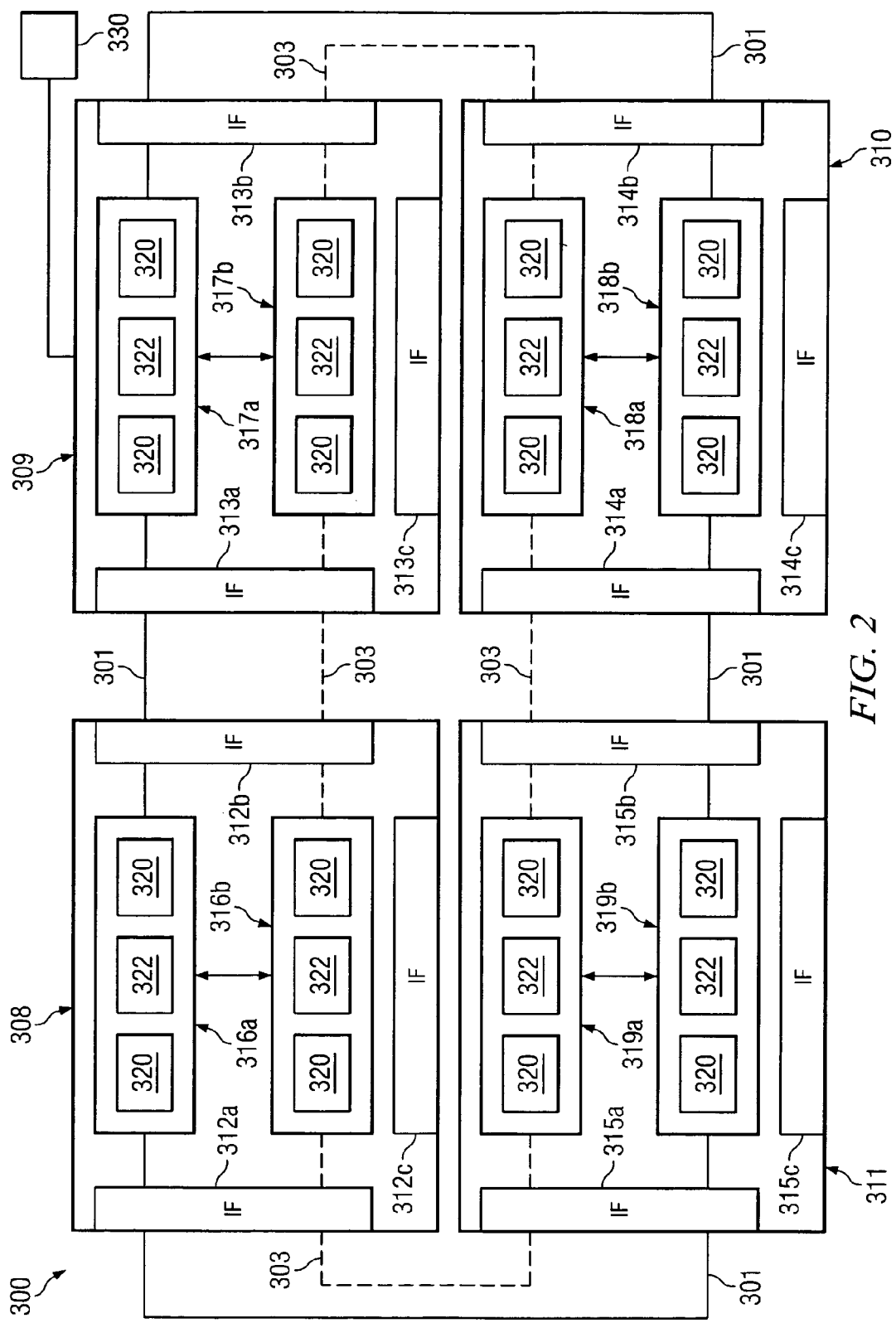
FIG. 2 illustrates an optical network and components of network nodes implementing protection path performance monitoring, in accordance with another embodiment of the present invention.

FIG. 2 illustrates an optical network 300 and components of network nodes 308, 309, 310 and 311, in accordance with another embodiment of the present invention. Optical network includes optical rings 301 and 303 interconnecting nodes 308-311 and an error detection unit 330. In the illustrated embodiment for example, ring 301 may carry working traffic along a working path from a source node to a destination node, and ring 303 may be designated for a protection path. Optical network 300 is similar to optical network 100 of FIG. 1 in many respects. Each node of network 300 includes interface units and switch fabric units coupled across a backplane. The backplane may comprise copper or other suitable connections to couple together both illustrated and non-illustrated components of the network nodes.

In particular, node 308 includes interface units 312a and 312b, add/drop interface unit 312c and switch fabric units 316a and 316b. Node 309 includes interface units 313a and 313b, add/drop interface unit 313c and switch fabric units 317a and 317b. Node 310 includes interface units 314a and 314b, add/drop interface unit 314c and switch fabric units 318a and 318b. Node 311 includes interface units 315a and 315b, add/drop interface unit 315c and switch fabric units 319a and 319b. In particular embodiments switch fabric units within a particular node may communicate traffic between each another. For example, switch fabric units 316a and 316b of node 308 may communicate traffic between each other.

Interface units 312-315 may comprise transceivers for transmission and receipt of traffic. The interface units may also comprise a combination of optical and electrical components for communicating traffic through the network.

In the illustrated embodiment, switch fabric units 316a, 317a, 318b and 319b perform switching on ring 301, and switch fabric units 316b, 317b, 318a and 319a perform switching on ring 303. Each switch fabric unit includes BLSR switching blocks 320 and an STS path switch unit, or cross-connect unit, 322. BLSR switching blocks 320 perform switching for the BLSR mechanism. STS path switch units 322 cross-connect STS paths, or switch traffic at the STS level.

Typical BLSR networks utilize only line level performance monitoring for the protection path which monitors the optical lines between nodes. If ring 303 of optical network 300 comprised a protection path, line level protection path performance monitoring applied to network 300 would only monitor the aggregate optical signal along ring 303 between the interface units of separate nodes. Thus, line level protection path performance monitoring only accounts for problems occurring between an interface unit of one network element, or node, to an interface unit of an adjacent node along the protection path.

However, particular embodiments, including optical network 300, implement path level performance monitoring for a protection path. If, for example, ring 303 comprised a protection path for particular working traffic communicated on ring 301, such path level performance monitoring would include monitoring the components within the nodes, such as the interface units, the switch fabric units, the backplanes, unit interconnections and other network element, or node, components along ring 303. Protection path monitoring looks at the individual signals transversing across both the optical layer and the electrical components.

In some cases, the protection path for particular working traffic communicated on the network may not be predetermined, as the particular protection path used may depend on where the failure is in the working path. Network components determine the protection path that will be set up on the fly when protection is needed as a result of a working path failure. Particular embodiments monitor and check the different spans that could be used in BLSR path protection for the network.

If a path error is detected and an optical line is not detecting any bit errors or other defects, then one may determine that the error is not in the optical line and is thus isolated to components of the network element or node, such as the backplane or switch fabric.

In operation, unused bandwidth reserved for the protection path communicates an idle signal containing standard SONET overhead bytes. In order to identify failures in the path, particular embodiments may continuously monitor and check the idle signal for any of the following on each individual STS path: bit error rate (BER), loss of pointer-path (LOP-P), alarm indication signal-path (AIS-P) or any other indication of an error. For example, the bit error rate byte (e.g., B3 byte) may be monitored through a BIP-8 check, a loss of pointer-path may be detected through the H1 and H2 bytes by identifying 8-10 invalid consecutive pointers, and an alarm indication signal-path may be identified by all 1s in the H1 and H2 bytes. Continuous monitoring can be implemented by monitoring all protection path channels at one time or by cycling through individual protection path channels, depending on the capability and requirements of a particular network. This monitoring may be implemented through logic in the switch fabric of the network nodes. It should be understood that other embodiments may utilize other ways to determine an error in a protection path of the network.

As indicated above, the illustrated embodiment includes an error detection unit 330. Error detection unit 330 may monitor the protection path and may receive and compile the monitoring results in order to determine the existence of a path level error in a protection path and isolate the error's location. Error detection unit 330 may comprise any suitable hardware, software or encoded logic and may be located at any suitable location of the optical network. For purposes of this specification, an error detection unit may comprise any component or combination of components associated with the optical network that may monitor a protection path and detect protection path errors. In particular embodiments, one or more of the nodes or network elements, such as the node switch fabric units, may comprise an error detection unit, and a plurality of node components may work together for error detection to implement the protection path performance monitoring discussed herein. In other embodiments, error detection unit 330 may be part of the network management system.

Monitoring and checking protection path spans before the paths are actually needed for protection switching may enable a customer to be warned ahead of time of an issue with protection. Without receiving such a warning, a customer may not know that the protection path is faulty, particularly with respect to a fault in the electrical components within a network node. Thus, in particular embodiments an alarm set may be generated to notify a network or system operator of a failure along the protection path. Such notification may enable a system operator to correct the protection path failure prior to having to use the protection path to carry traffic as a result of a working path failure.

As an example with respect to optical network 300 of FIG. 2, if ring 303 is used for protection paths for working traffic communicated along ring 301, then particular embodiments monitor individual path level spans of ring 303 to detect path level errors in the protection path. For example, moving in a clockwise direction for discussion purposes, the span between and including switch fabric unit 316b of node 308 and switch fabric unit 317b of node 309 is monitored; the span between and including switch fabric unit 317b of node 309 and switch fabric unit 318a of node 310 is monitored; the span between and including switch fabric unit 318a of node 310 and switch fabric unit 319a of node 311 is monitored; and the span between and including switch fabric unit 319a of node 311 and switch fabric unit 316b of node 308 is monitored. Such monitoring thus includes not only the optical fibers between the nodes but also the node components, including electrical components of interface units along ring 303, backplanes, and components of the switch fabric units. Error detection unit 330 may perform such monitoring for error identification, for example in connection with the switch fabric units. If an error is detected at the path level in any such span monitored above, then error detection unit 330 may warn a system operator that a protection path incorporating such span in which the error is detected may not work properly if it is needed to communicate traffic for protection.

Figure 3:
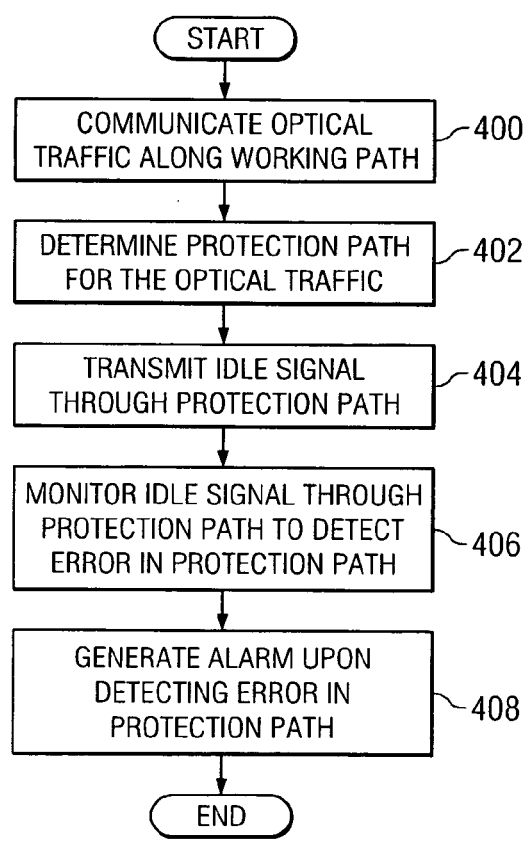
FIG. 3 illustrates a method for monitoring an optical network, in accordance with a particular embodiment.

FIG. 3 is a flowchart illustrating a method for monitoring an optical network, in accordance with a particular embodiment. The method begins at step 400 where optical traffic is communicated along a working path of an optical network. At step 402, a protection path for the optical traffic is determined. The working traffic may be switched to the protection path, for example through a BLSR switching mechanism, in the event of a failure in the working path. The protection path may comprise two or more network elements coupled together by optical lines of the network.

At step 404, an idle signal is transmitted through the protection path. At step 406, the idle signal is monitored to detect an error in the protection path. Such monitoring may include monitoring a B3 byte of the idle signal to detect a bit error rate error or monitoring H1 and H2 bytes of the idle signal to detect either a loss of pointer-path or alarm indication signal error. The detected error may comprise an error in electrical components of network nodes along the protection path, such as a backplane, switch fabric unit or interface unit of the network nodes.

It should be understood that in particular embodiments the protection path may not be determined prior to a failure in the working path. Each span of protection bandwidth of the network allotted for protection may be monitored for path level error. An error may be detected in a particular span, and the network may determine that a protection path for working traffic would incorporate such span. Thus, it is then determined that the protection path includes an error that may cause a problem of the protection path is needed.

At step 408, an alarm is generated upon detecting an error in the protection path. The alarm notifies a system operator that the protection path may not work properly if needed in the event of a working path failure.

Some of the steps illustrated in FIG. 3 may be combined, modified or deleted where appropriate, and additional steps may also be added to the flowchart. Additionally, as indicated above, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within optical networks 100 and 300 and nodes 308-311, other and different components may be utilized to accommodate particular needs. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for monitoring an optical network, comprising:
   communicating optical traffic along a working path of an optical network;
   the optical network comprising a protection path for the optical traffic to communicate the optical traffic upon a failure in the working path;
   the protection path comprising two or more network elements coupled together by optical lines; and
   while communicating optical traffic along the working path, monitoring an idle signal of the protection path to detect an error in the protection path comprising an error in a component of one or more of the network elements.

2. The method of claim 1, further comprising generating an alarm upon detection of an error in the protection path.

3. The method of claim 1, wherein:
   each of the two or more network elements comprises a switch fabric unit along the protection path;
   the protection path comprises one or more spans interconnecting switch fabric units of adjacent network elements of the two or more network elements;
   the one or more spans comprising:
      an optical line between the adjacent network elements;
      interface units between the interconnected switch fabric units;
      backplanes coupling together components between the interconnected switch fabric units within the adjacent network elements; and
      the switch fabric units of the adjacent network elements; and
   monitoring an idle signal of the protection path to detect an error in the protection path comprises monitoring each of the one or more spans of the protection path.

4. The method of claim 1, wherein monitoring an idle signal of the protection path to detect an error in the protection path comprising an error in a component of one or more of the network elements comprises monitoring an idle signal of the protection path to detect an error in the protection path comprising an error in a backplane of one or more of the network elements.

5. The method of claim 1, wherein monitoring an idle signal of the protection path to detect an error in the protection path comprising an error in a component of one or more of the network elements comprises monitoring an idle signal of the protection path to detect an error in the protection path comprising an error in an interface unit of one or more of the network elements.

6. The method of claim 1, wherein monitoring an idle signal of the protection path to detect an error in the protection path comprising an error in a component of one or more of the network elements comprises monitoring an idle signal of the protection path to detect an error in the protection path comprising an error in a switch fabric unit of one or more of the network elements.

7. The method of claim 1, wherein monitoring an idle signal to detect an error comprises monitoring a B3 byte of the idle signal to detect a bit error rate error.

8. The method of claim 1, wherein monitoring an idle signal to detect an error comprises monitoring H1 and H2 bytes of the idle signal to detect a loss of pointer-path error.

9. The method of claim 1, wherein monitoring an idle signal to detect an error comprises monitoring H1 and H2 bytes of the idle signal to detect an alarm indication signal-path error.

10. A system for monitoring an optical network, comprising:
    an optical network comprising a plurality of network elements coupled together by optical lines;
    the optical network operable to communicate optical traffic along a working path of the optical network;
    the optical network comprising a protection path for the optical traffic to communicate the optical traffic upon a failure in the working path;
    the protection path comprising two or more of the plurality of network elements and the optical lines coupling together the two or more of the plurality of the network elements; and
    an error detection unit associated with the optical network, the error detection unit operable, while optical traffic is being communicated along the working path, to monitor an idle signal of the protection path to detect an error in the protection path comprising an error in a component of the two or more of the plurality of network elements.

11. The system of claim 10, wherein the error detection unit is further operable to generate an alarm upon detection of an error in the protection path.

12. The system of claim 10, wherein:
    each of the two or more of the plurality of network elements comprises a switch fabric unit along the protection path;
    the protection path comprises one or more spans interconnecting switch fabric units of adjacent network elements of the two or more of the plurality of network elements;
    the one or more spans comprising:
       an optical line between the adjacent network elements;

interface units between the interconnected switch fabric units;

backplanes coupling together components between the interconnected switch fabric units within the adjacent network elements; and the switch fabric units of the adjacent network elements; and the error detection unit operable to monitor an idle signal of the protection path to detect an error in the protection path comprises the error detection unit operable to monitor each of the one or more spans of the protection path.

13. The system of claim 10, wherein the error detection unit operable to monitor an idle signal of the protection path to detect an error in the protection path comprising an error in a component of the two or more of the plurality of network elements comprises the error detection unit operable to monitor an idle signal of the protection path to detect an error in the protection path comprising an error in a backplane of the two or more of the plurality of network elements.

14. The system of claim 10, wherein the error detection unit operable to monitor an idle signal of the protection path to detect an error in the protection path comprising an error in a component of the two or more of the plurality of network elements comprises the error detection unit operable to monitor an idle signal of the protection path to detect an error in the protection path comprising an error in an interface unit of the two or more of the plurality of network elements.

15. The system of claim 10, wherein the error detection unit operable to monitor an idle signal of the protection path to detect an error in the protection path comprising an error in a component of the two or more of the plurality of network elements comprises the error detection unit operable to monitor an idle signal of the protection path to detect an error in the protection path comprising an error in a switch fabric unit of the two or more of the plurality of network elements.

16. The system of claim 10, wherein the error detection unit operable to monitor an idle signal to detect an error comprises the error detection unit operable to monitor a B3 byte of the idle signal to detect a bit error rate error.

17. The system of claim 10, wherein the error detection unit operable to monitor an idle signal to detect an error comprises the error detection unit operable to monitor H1 and H2 bytes of the idle signal to detect a loss of pointer-path error.

18. The system of claim 10, wherein the error detection unit operable to monitor an idle signal to detect an error comprises the error detection unit operable to monitor H1 and H2 bytes of the idle signal to detect an alarm indication signal-path error.

19. Logic for monitoring an optical network, the logic encoded in a computer-readable medium and operable when executed to perform the steps of:

communicating optical traffic along a working path of an optical network;

the optical network comprising a protection path for the optical traffic to communicate the optical traffic upon a failure in the working path;

the protection path comprising two or more network elements coupled together by optical lines; and while communicating optical traffic along the working path, monitoring an idle signal of the protection path to detect an error in the protection path comprising an error in a component of or more of the network elements.

20. The logic of claim 19, further operable when executed to perform the step of generating an alarm upon detection of an error in the protection path.

21. The logic of claim 19, wherein:

each of the two or more network elements comprises a switch fabric unit along the protection path;

the protection path comprises one or more spans interconnecting switch fabric units of adjacent network elements of the two or more network elements;

the one or more spans comprising:

an optical line between the adjacent network elements;

interface units between the interconnected switch fabric units;

backplanes coupling together components between the interconnected switch fabric units within the adjacent network elements; and the switch fabric units of the adjacent network elements; and the logic operable when executed to perform the step of monitoring an idle signal of the protection path to detect an error in the protection path comprises the logic operable when executed to perform the step of monitoring each of the one or more spans of the protection path.

22. The logic of claim 19, wherein the step of monitoring an idle signal of the protection path to detect an error in the protection path comprising an error in a component of one or more of the network elements comprises the step of monitoring an idle signal of the protection path to detect an error in the protection path comprising an error in a backplane of one or more of the network elements.

23. The logic of claim 19, wherein the step of monitoring an idle signal of the protection path to detect an error in the protection path comprising an error in a component of one or more of the network elements comprises the step of monitoring an idle signal of the protection path to detect an error in the protection path comprising an error in an interface unit of one or more of the network elements.

24. The logic of claim 19, wherein the step of monitoring an idle signal of the protection path to detect an error in the protection path comprising an error in a component of one or more of the network elements comprises the step of monitoring an idle signal of the protection path to detect an error in the protection path comprising an error in a switch fabric unit of one or more of the network elements.

25. The logic of claim 19, wherein the step of monitoring an idle signal to detect an error comprises the step of monitoring a B3 byte of the idle signal to detect a bit error rate error.

26. The logic of claim 19, wherein the step of monitoring an idle signal to detect an error comprises the step of monitoring H1 and H2 bytes of the idle signal to detect a loss of pointer-path error.

27. The logic of claim 19, wherein the step of monitoring an idle signal to detect an error comprises the step of monitoring H1 and H2 bytes of the idle signal to detect an alarm indication signal-path error.

28. A method for monitoring an optical network, comprising:

communicating optical traffic along a working path of an optical network;

the optical network comprising a protection path for the optical traffic to communicate the optical traffic upon a failure in the working path;

the protection path comprising two or more network elements coupled together by optical lines;

while communicating optical traffic along the working path, monitoring an idle signal of the protection path to detect an error in the protection path comprising an error in a backplane, an interface unit or a switch fabric unit of one or more of the network elements;

generating an alarm upon detection of an error in the protection path; and the error comprising one or more of a bit error rate error, a loss of pointer-path error or an alarm indication signal-path error.

29. The method of claim 28, wherein:

each of the two or more network elements comprises a switch fabric unit along the protection path;

the protection path comprises one or more spans interconnecting switch fabric units of adjacent network elements of the two or more network elements;

the one or more spans comprising:
- an optical line between the adjacent network elements;
- interface units between the interconnected switch fabric units;
- backplanes coupling together components between the interconnected switch fabric units within the adjacent network elements; and
- the switch fabric units of the adjacent network elements; and monitoring an idle signal of the protection path to detect an error in the protection path comprises monitoring each of the one or more spans of the protection path.

* * * * *